United States Patent
Popovski et al.

(10) Patent No.: US 12,191,750 B2
(45) Date of Patent: Jan. 7, 2025

(54) TRANSPORT DEVICE FOR TRANSPORTING AT LEAST ONE OBJECT AND/OR ONE PERSON

(71) Applicant: HENK B.V., Rotterdam (NL)

(72) Inventors: Filip Popovski, Kichevo (MK); Marko Naseki, Prilep (MK); Tashko Ritzov, Skopje (MK); Heiko Poerz, Castrop-Rauxel (DE)

(73) Assignee: HENK B.V., Rotterdam (NL)

( * ) Notice: Subject to any disclaimer, the term of this patent is extended or adjusted under 35 U.S.C. 154(b) by 486 days.

(21) Appl. No.: 17/309,904

(22) PCT Filed: Dec. 30, 2019

(86) PCT No.: PCT/EP2019/087170
§ 371 (c)(1),
(2) Date: Jun. 28, 2021

(87) PCT Pub. No.: WO2020/141164
PCT Pub. Date: Jul. 9, 2020

(65) Prior Publication Data
US 2022/0094242 A1    Mar. 24, 2022

(30) Foreign Application Priority Data

Dec. 31, 2018 (DE) .......................... 102018133718.3
Dec. 31, 2018 (DE) .......................... 202018006054.2

(51) Int. Cl.
*H02K 7/18* (2006.01)
*B60K 7/00* (2006.01)
(Continued)

(52) U.S. Cl.
CPC ......... *H02K 7/1846* (2013.01); *B60K 7/0007* (2013.01); *H02K 11/0094* (2013.01);
(Continued)

(58) Field of Classification Search
CPC ............. H02K 7/1846; H02K 11/0094; H02K 11/0141; H02K 13/003; B60K 7/0007; B60B 27/0015; B60L 53/50
See application file for complete search history.

(56) References Cited

U.S. PATENT DOCUMENTS

| 2014/0183996 A1* | 7/2014 | He .................. H02K 51/00 310/74 |
| 2014/0365055 A1* | 12/2014 | Fujiyoshi .............. B60W 10/06 180/65.265 |

FOREIGN PATENT DOCUMENTS

| CN | 102647060 A | 8/2012 |
| DE | 202016000172 U1 | 6/2016 |

(Continued)

OTHER PUBLICATIONS

English translation of international search report and written opinion for PCT/EP2019/087170 mailed Apr. 8, 2020.

*Primary Examiner* — Tulsidas C Patel
*Assistant Examiner* — Mohammed Ahmed Qureshi
(74) *Attorney, Agent, or Firm* — Thompson Coburn LLP

(57) ABSTRACT

A transport device can be moved over a floor in order to transport at least one object and/or one person by means of at least one rolling device (3). A drive element (4) can be rotated at least indirectly using the rolling device (3). The drive element (4) comprises at least two drive magnets (12). An output element (7) is provided which has at least two output magnets (15). The number of drive magnets (12) differs from the number of output magnets (15). At least one non-magnetic shielding element (5) is provided in order to change the orientation of a magnetic field located between the chive element (4) and the output element (7). The output element (7) can be rotated. At least one stator winding (8) is
(Continued)

arranged in which the output element (7) can be rotated about an axis of rotation (11) in order to generate electric current.

20 Claims, 4 Drawing Sheets

(51) Int. Cl.
    *H02K 11/00*     (2016.01)
    *H02K 11/01*     (2016.01)
    *H02K 13/00*     (2006.01)
    *B60B 27/00*     (2006.01)
    *B60L 53/50*     (2019.01)

(52) U.S. Cl.
    CPC ....... *H02K 11/0141* (2020.08); *H02K 13/003* (2013.01); *B60B 27/0015* (2013.01); *B60L 53/50* (2019.02)

(56) References Cited

FOREIGN PATENT DOCUMENTS

| | | |
|---|---|---|
| GB | 409501 | 5/1934 |
| WO | 2010082893 A1 | 7/2010 |

\* cited by examiner

TRANSPORT DEVICE FOR TRANSPORTING AT LEAST ONE OBJECT AND/OR ONE PERSON

CROSS-REFERENCE TO RELATED APPLICATIONS

This application is a U.S. National Phase application of PCT/EP2019/087170, published as WO 2020/141164, filed on Dec. 30, 2019, which claims priority to DE 10 2018 133 718.3 and DE 20 2018 006 054.2 both filed on Dec. 31, 2018, the disclosures all of which are incorporated by reference herein.

The invention relates to a transport device for displacing over a floor for transporting at least one object and/or one person by means of at least one rolling device.

A drive element is provided and can be at least indirectly caused to rotate by the rolling device.

A transport means comprising an integrated energy generator is known from DE 20 2016 000 172 U1.

The energy generator is connected to wheels present on both sides of the transport means for generating electric energy.

The known prior art is disadvantageous, however, in that the energy generator is disposed in the transport device in a manner such that said generator is exposed to damage by the transported object or by the transported person.

The arrangement of the energy generator further reduces the capacity of the transport device for objects. Particularly, the standing area available for transporting a person is reduced by the positioning of the energy generator.

Object of the Invention

It is therefore the object of the invention to provide a transport device for transporting at least one object and/or one person while avoiding the disadvantages indicated above.

A further object of the invention is to provide a transport device requiring less technical effort and therefore being less expense to produce.

The number of components required for generating electric current should be able to be reduced and combined in a space-saving arrangement.

Achieving the Object

The objects are achieved by a transport device for displacing over a floor for transporting at least one object and/or one person by means of at least one rolling device.

A drive element is provided and can be at least indirectly caused to rotate by the rolling device.

The drive element comprises at least two drive magnets.

An output element comprising two or more output magnets is further provided.

The number of drive magnets deviates from the number of output magnets.

At least one non-magnetic shielding element is provided for altering the alignment of a magnetic field disposed between the drive element and the output element.

The output element can be caused to rotate.

At least one stator winding is disposed, in which the output element can be rotated about an axis of rotation for generating electric current.

The object is further achieved by a method for producing an electric current by means of the transport device.

Transport Device

The invention understands a transportation means to be an operating device for transporting objects and/or a person.

The invention comprises transport devices for pushing or pulling by a person. Transport devices driven by muscle power, preferably by a person, are further provided.

The transport device is preferably and by no means exclusively a stroller, a sport stroller, a combo stroller, a buggy, or a multi-seat stroller.

The invention further comprises a handicap buggy, a handicap stroller, and/or a wheelchair.

The term transport device also comprises strollers a with a pedal function.

The term transport device also includes shopping carts, handcarts, and/or wheelbarrows.

The invention further comprises further single- or multi-axle transport devices, preferably driven by one person, in that the person continuously has both feet on the transport device during forward motion.

The transport device can thereby be a unicycle or a bicycle or a bike having at least three axles.

The invention further comprises such transport devices for being set in motion by one person, in that the person pushes off of the ground with one foot at least intermittently for setting said device in motion.

The invention particularly comprises hoverboards, scooters, shopping carts, skateboards, and/or Segways as transport devices.

It is self-evident that the preceding list is only an example and is in no way fully comprehensive.

In the following, it is assumed that the transport device is a rolling suitcase. The rolling suitcase is displaced over a floor by means of at least one rolling device.

Rolling Device

The rolling device is an object preferably entirely enclosing a wheel of the transport device. The wheel rolls on the floor by means of the rolling device.

The rolling device is preferably annular in design. The rim of a wheel can preferably be placed in the inner circumference of the rolling device.

The rolling device is manufactured at least in part of rubber or of a plastic.

The rubber of the rolling device has a specific shape. The rubber can be connected to the drive element. The rolling device can be cast integrally with the drive element.

The rolling device can also be manufactured of any other material, such as wood or metal.

The rolling device can enclose at least one rotatably supported wheel.

Drive Element

According to the invention, the drive element is an annular collar.

The annular collar thereby comprises at least two magnets.

The drive element is connected at least indirectly to the rolling device.

The drive element can be connected to the rolling device by means of a force fit and/or an adhesive bond and/or by means of interlocking. It is conceivable that the drive element is glued to the rolling device.

The drive element is disposed rotatably. The rotational speed of the drive element matches the rotational speed of the rolling device.

The drive element can rotate in the same direction or in the opposite direction of the rolling device.

The drive element preferably comprises two, but particularly a plurality of differently poled magnets.

The differently poled magnets are connected to each other in a circular shape for implementing the drive element.

The magnets disposed in the drive element are designated as drive magnets.

Output Element

The invention understands the term output element to mean an annular structure. The output element comprises at least two oppositely poled magnets.

The number of magnets disposed in the output element is less than the number of magnets positioned in the drive element.

The magnets disposed adjacent to each other in the output element are designated as output magnets.

The output element is annular in design. The output element is particularly freely rotatable about an axis of rotation relative to the drive element.

The output elements comprise high-quality neodymium magnets. Said magnets are the strongest magnets in the world. The output elements have a simple shape. Said elements are commercially available and can be installed after minor modification.

The output elements can be manufactured of the same material as the drive elements. The output elements have a specific shape. The output elements therefore require even more precise manufacturing precision.

Shielding Element

The shielding element preferably, but not exclusively, comprises a non-magnetic ring.

The following assumes as an example an annular, non-magnetic body in the form of a cage. The non-magnetic body is at least partially constructed of metal.

The shielding element comprises a plurality of metal segments.

The metal segments can be made at least partially of steel.

The shielding element is preferably, but not exclusively, disposed between the drive element and the output element.

The drive element and/or the shielding element and/or the output element can each be annular in design.

The shielding element can be disposed in the interior of the annular drive element.

The annular output element can be positioned in the interior of the annular shielding element.

The shielding element is made of high-quality titanium (grade 1). The shielding element is produced using conventional material removal techniques.

Metal Segments

The metal segments are made of ferritic stainless steel. Said elements have a comparably simple shape and small dimensions. The metal segments require a high level of manufacturing precision.

Stator Having Stator Windings

The output element is disposed in the region of a stator. The stator comprises at least two electrical windings.

The electrical windings are connected to each other in a ring shape. The electrical windings form an annular stator.

The output element is disposed between the electrical windings in a region enclosed by the electrical windings of the stator.

The output element can be implemented as a stator.

The stator having the stator windings can preferably, but not exclusively, comprise 120 metal coils.

The coils are preferably wound about each other.

For example, but not exclusively, 20 coils can be wound together such that the width of said coils matches the width of the rolling device.

Preferably, but not exclusively, six layers comprising coils can overlap each other.

The transport device has been found to be extremely advantageous, as the efficiency of generating electric current can be over 90%.

The transport device for generating electric current has been found to be extremely reliable.

No mechanical friction occurs between the drive element and/or the output element and/or the shielding element and/or the stator winding.

The elimination of any mechanical friction is based on the use of permanent magnets and the metal segments of the shielding element.

The transport device for generating electric current is particularly maintenance-friendly due to the absence of mechanical friction between the components.

A highly corrosion-resistant alloy is used for generating the stator. The alloy is easily produced using conventional manufacturing methods. The alloy can be produced on a 13-axis CNC machine. The alloy can be polished and painted.

Commercially typical copper wires are used for producing the stator windings. No further processing of the wires is required prior to assembly.

Transport Device for Generating Electric Current

By displacing the transport device by means of human muscle power, the at least one rolling device rolls over a floor.

The drive element is at least indirectly caused to rotate by the rolling device.

It is assumed for simplification, but in no way exclusively, that the rotational speed of the rolling device matches the rotational speed of the drive element.

It is further assumed that the drive element is annular in design.

The drive element comprises a plurality of magnets each disposed adjacent to each other. The drive magnets form the annular drive element.

The rotation of the drive element having the plurality of drive magnets produces a magnetic field.

The magnetic field comprises a plurality of north and south poles disposed alternately adjacent to each other.

The rotation of the drive element about an axis of rotation also causes the magnets disposed alternately as north and south poles to rotate about the axis of rotation.

The output element is disposed in the region of the drive element.

The drive element comprises at least two magnets each forming a north pole and a south pole.

The number of magnets of the output element is less than the number of magnets of the drive element.

A magnetic field is disposed between the drive element and the output element.

The shielding element is preferably positioned between the drive element and the output element.

The shielding element modifies the magnetic field formed between the drive element and the output element.

By rotating the drive element and the associated magnets, the drive element can be caused to rotate about the axis of rotation.

The output element thereby comprises two magnets each having two north poles and two south poles.

The output element rotates at a rotational speed about the axis of rotation exceeding the rotational speed of the drive element.

The metal segments of the shielding element modify the magnetic field disposed between the drive element and the output element.

Modifying the magnetic field between the drive element and the output element brings about a multiplication of the number of rotations of the output element about the axis of rotation and the number of rotations of the drive element about the axis of rotation.

Modifying the magnetic field between the drive element and the output element by means of the shielding element having the metal segments thereof brings about an increase in the rotational speed of the drive element about the axis of rotation.

The metal segments of the shielding element are retained in the shielding element.

Purely as an example, and in no way exclusively, it is assumed that the shielding element is a mechanical annular structure. The metal segments are preferably distributed in the direction of the axis of rotation across the annular shape of the shielding element.

The output element rotates about its axis of rotation in the region of the stator windings.

By rotating the output magnets of the output element within the at least two stator windings, an electrical voltage arises in the stator windings.

The generating of electric voltage corresponds to generating electric energy.

The electrical energy generated by means of the transport device can be diverted to a store of electrical energy, preferably to a battery.

Embodiments of the Invention

In one embodiment of the invention, the drive element and/or the output element and/or the shielding element and/or the stator windings are disposed in the rolling device.

In this manner, all components disposed in the transport device for generating electric current are disposed in the rolling device.

The components of the transport device for generating electric current are thereby protected against further damage.

A receiving space of the transport device for receiving objects is not occupied by the components for generating electric current.

The standing space for a person in and/or on the transport device is preferably not reduced.

According to a further embodiment of the invention, the drive element is the rolling device.

The components of the transport device for generating electric current comprise at least one drive element and/or at least one rolling device and/or at least one output element and/or at least one shielding element and/or at least one stator winding.

The components of the transport device for generating electric current are spatially comprised in the rolling device.

The rolling device can thereby correspond to the drive element.

The drive element can be directly or at least indirectly caused to rotate about the axis of rotation by the rolling device.

According to a further embodiment of the invention, a wheel encloses the rolling device of the transport device.

The size and/or width and/or circumference of the wheel is adapted to the size and/or the spatial extent of the transport device.

The wheel can comprise a penetration for receiving a hub.

The wheel can be implemented as a disc or can comprise spokes.

The wheel is made at least partially of metal. The rolling device is provided radially on the outer circumference of the wheel. The wheel rolls on the floor by means of the rolling device.

According to a further embodiment of the invention, the at least one drive magnet and/or the at least one output magnet are implemented as permanent magnets.

It is further provided that the number of drive magnets is greater than the number of output magnets.

The greater number of magnets of the drive element and the lesser number of magnets in the output element act as a magnetic transmission.

The magnetic transmission comprises a great difference in the rotational speed of the drive element relative to the rotational speed of the output element.

The rotational speed of the drive element is transmitted to the drive element by the rolling device.

The rotational speed of the output element, in contrast, is transformed into electrical energy by means of the windings of the stator.

A high effectiveness arises thereby for generating electric current by the transport device. The high effectiveness is not reduced by mechanical friction. Lubricating of mechanical components moving relative to each other is not necessary.

According to another embodiment of the invention, the drive element is annular in design. A plurality of drive magnets are disposed adjacent to each other in the annular drive element.

Due to the annular design thereof, the drive element can be disposed in a wheel. The drive element can also be positioned in a differently implemented rolling device.

The north and south poles of the plurality of drive magnets disposed adjacent to each other bring about a particularly distinctive increase in the rotational speed of the output element about the axis of rotation of the output element.

The increase in rotation can thus be transmitted from the drive element to the output element unimpeded by any frictional losses.

According to another embodiment of the invention, the drive element and/or the output element and/or the shielding element and/or the stator winding are disposed adjacent to each other without contacting each other.

Generating electrical energy in the transport device in this manner is preferably possible without further mechanical losses in the form of friction.

Additional maintenance and repair effort due to lubricating mechanically interacting components is not necessary.

The present invention for generating electrical energy can be implemented in any type of transport device. Depending on the size, weight, and extent of the transport device, the size of the components provided for generating electrical energy can be increased or decreased.

The adapting of the size and/or the adapting of the increase in rotational speed of the output element is done by increasing or decreasing the number of drive magnets in the drive element.

Increasing or decreasing the number of the metal segments in the shielding element is also possible.

It is further provided that the rolling device can be connected to the drive element.

The components of the transport device provided for generating electric current are freely displaceable relative to each other.

The free displaceability of the components relative to each other is ensured in each by an air gap.

The drive element is at least indirectly connected to the rolling device for transmitting the kinetic energy in the drive element introduced into the rolling device by displacing the rolling device over the floor.

The drive element can be connected to the rolling device by means of a force fit and/or an adhesive bond and/or by means of interlocking.

The drive element can be encapsulated in a rolling device made of rubber.

The drive element can be permanently connected to the rolling device.

According to another embodiment of the invention, the electric current generated in the transport device can be transmitted from the stator winding to a store for electrical energy.

The store for electrical energy is preferably a battery.

An electrical conductor is preferably disposed on the rolling device for feeding out the electrical energy.

The conductor is a cable for direct current or alternating current.

The cable is connected to a region of the rolling device by means of a cable output, said region not rotating about the axis of rotation, preferably the hub.

The connecting of the conductor from the stator windings to the electrical store can be applied to any rolling device.

As an example, and in no way exclusively, the electric current can be transmitted from the stator to the electrical store by means of at least one slip-ring contact.

The requirement for additional mechanical bearings is eliminated.

The battery is disposed in/on the transport device such that easy access to the battery is ensured.

The battery can be implemented as a battery cell. The person can remove the battery cell from the transport device and use said cell as a portable electrical power source.

The electrical energy generated by means of the transport device can be intermediately stored in a battery. The electrical energy generated in the transport device is particularly useful for charging a mobile phone and/or a laptop and/or any other electronic device.

Example

Calculations and Explanation of the System

Neodymium magnets are preferably used as permanent magnets.

The strength of the permanent magnets is preferably 14000 Gauss. Said strength corresponds to magnetic induction.

$B=1.4$ T—magnetic induction $e_p=B*1*V$—voltage induced in the conductor $e_m=2*e_p$—voltage induced in one of the coils $e_{nom}=w*e_m$—total induced voltage $w=120$—total number of coils $1=15$ [mm]—active coil length $V$—linear speed of the coil (or the rolling device)

$V=w*R$—rotational frequency of the rolling device*outer radius of the rolling device $R=40$ [mm]—outer radius $n=250$ [min$^{-1}$]—revolutions of the rolling device per minute $V=[1$ m/s$]$—linear (motion) velocity of the rolling suitcase $e_p=B*1*V=1.4*0.015*1=0.022$ [V]

$e_m=2*e_p=0.022=0.044$ [V]

$e_{nom}=w*e_m=5.28$ [V]

Said charge relates to coils connected to each other in series. The charge corresponds to an alternating-current voltage and must be converted to direct-current voltage. The converting is done by means of a simple diode. The charge is converted into direct current. The converting of the charge into direct current is necessary for charging a mobile phone, for example.

All further auxiliary electronics are integrated in the battery.

A li-poly lithium polymer battery is used as the battery.

Said type of battery can be cast in any required shape.

The size of the battery should not exceed dimensions of 80×50×10 mm including all electronics.

Due to the frictionless design of the rolling device (preferably in a wheel), the generated electrical energy is proportional to the weight of the transport device (preferably of the rolling suitcase).

This means that a heavier suitcase is more effective when generating electrical energy.

When the rolling suitcase is in motion, it is not difficult to maintain the rolling suitcase in motion while electrical energy is being generated.

$p=(\varphi*F_\mu*d*)/318310=(0.5*22.5*80*1000)/318310=22.92$ [W]—potential strength of the generator $\varphi=0.5$—coefficient of efficiency $F_\mu=\mu*F=0.9*25=22.05$ [N]—frictional force at each individual wheel $\rho=0.9$—coefficient of friction $F=0.25*G*g=25$ [N]—force of the rolling suitcase relative to the rolling device (preferably: an individual wheel)

d [mm]—outer circumference of the rolling device (wheel)

The value 1000 is used in the above formula for converting the units from kW to W.

$P=1*U$—electrical energy of the generator $U=5$ [V]—direct voltage for charging the battery $1=P/U=4.5$ [A]—current flowing to the battery According to the theoretical calculation of the electrical energy generated by means of the wheels, the mechanism according to the invention is preferably installed in each of two wheels. A sufficient amount of electrical energy for rapidly charging or charging in a short time is thereby generated.

The system according to the invention can also be implemented in further wheels. If four wheels are used, then the system according to the invention can be used for charging a laptop.

Parts of the Rolling Device—Weight and Material

| Part name | Quantity | Material | Weight (in grams) |
| --- | --- | --- | --- |
| Stator of the rolling device (wheel) | 1 | 5052 Aluminum alloy | 50 |
| Stator windings | 1 | Copper wire (0.5 mm diameter) | 15 |
| Shielding element | 1 | Titanium (grade 1) | 38 |
| Metal segment | 20 | Stainless steel (ferritic) | 20 (total) |
| Drive element | 30 (15 of each polarity) | Neodymium magnet | 70 (total) |

-continued

| Part name | Quantity | Material | Weight (in grams) |
|---|---|---|---|
| Rubber | 1 | Rubber | 20 |
| Output element | 4 (2 of each polarity) | Neodymium magnet | 10 (total) |
| Total | | | 223 +/− 5% |

Material Properties

1. The aluminum alloy 5052 is an aluminum alloy preferably comprising magnesium and chromium as components. The aluminum alloy 5052 has exceptional anticorrosive properties and good formability. The alloy is also easily machined.
2. Copper wire with a diameter of 0.5 mm is widely available and requires no further explanation.
3. Titanium (grade 1) has excellent formability. Said material has excellent corrosion resistance and high notch impact strength.
4. Ferritic stainless steel from group 5 (446, 445, and 447): This group of special stainless steels has a relatively high chromium content. The chromium content results in excellent corrosion resistance. Magnetic stainless steel is used in place of an austenitic stainless steel, because the magnetic field is changed as described above.
5. Neotinium magnets are the strongest magnets available on the market. Neotinium magnets are necessary in order to optimize the efficiency and performance capacity for generating electric current in the transport device.
6. Conventional rubber is used for producing the rolling device.

Additional Components

| Part name | Comment | Weight in kg |
|---|---|---|
| Battery | Lithium polymer | 0.2 |
| Safety electronics | 1. Direct current vs alternating current converter<br>2. Battery monitoring system<br>3. USB connection | 0.05 |
| Slip ring | Figure | 0.1 |

DESCRIPTION OF THE DRAWINGS

Further examples and embodiments of the invention are described in more detail using the drawing.

Shown are.

DETAILED DESCRIPTION

Figure 1:
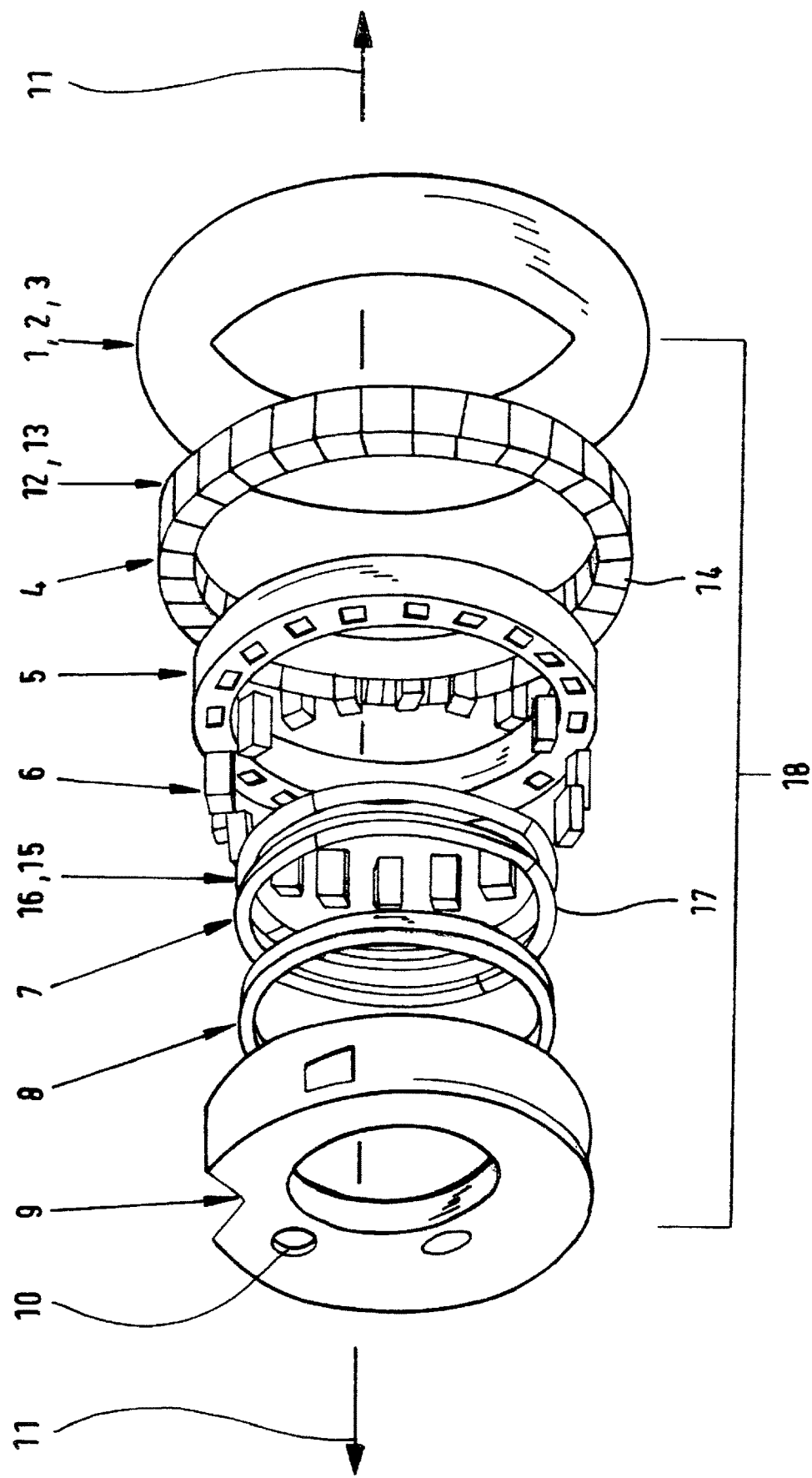
FIG. 1 the components of the transport device for generating electric current, FIG. 2 a rolling device having contacts for feeding out electric current to a battery, FIG. 3 a slip-ring contact for conducting the electric current onward to the battery, and FIG. 4 the rolling device having a fork for guiding the rolling device.

FIG. 1 shows, from right to left, a rubber sheath 1 of a wheel 2 for the transport device 23 (not shown).

The rolling device 3 comprises as components 18 the rubber sheath 1, a drive element 4, and a shielding element 5.

The shielding element 5 comprises two or more metal segments 6.

The rolling device 3 comprises as further components at least one output element 7 and stator windings 8.

FIG. 1 further shows a rim 9 of the rolling device 3.

The reference numeral 10 indicates electrical contacts for feeding out the generated electrical energy.

The reference number 11 indicates an axis of rotation for rotating the drive element 4 and the output element 7.

The drive element 4 comprises drive magnets 12, wherein every drive magnet 12 comprises one north pole 13 and one south pole 14 each.

The output element 7 comprises output magnets 15 each comprising a north pole 16 and a south pole 17.

Figure 2:
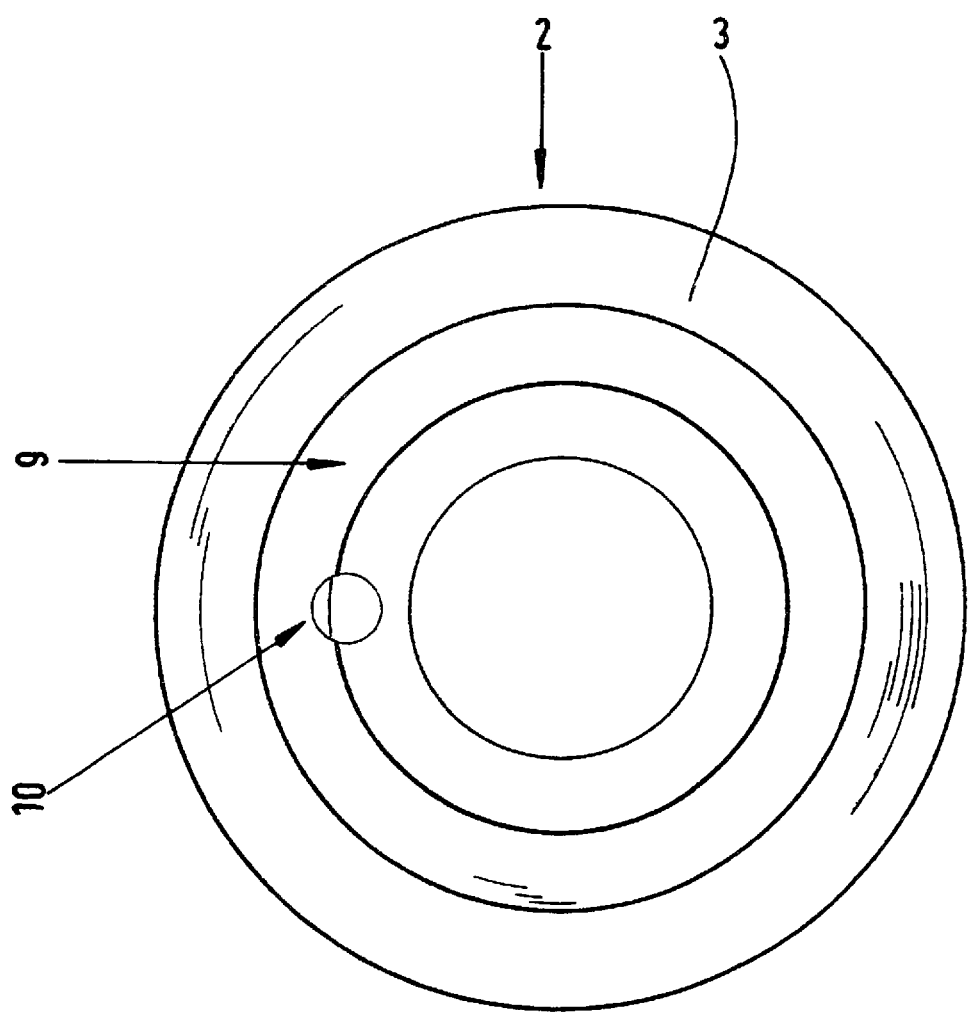

FIG. 2 shows the wheel 2 and the rolling device 3. The rim 9 is shown radially within the rolling device 3.

The contacts 10 are used for feeding out the electrical energy generated by means of the components 18.

Figure 3:
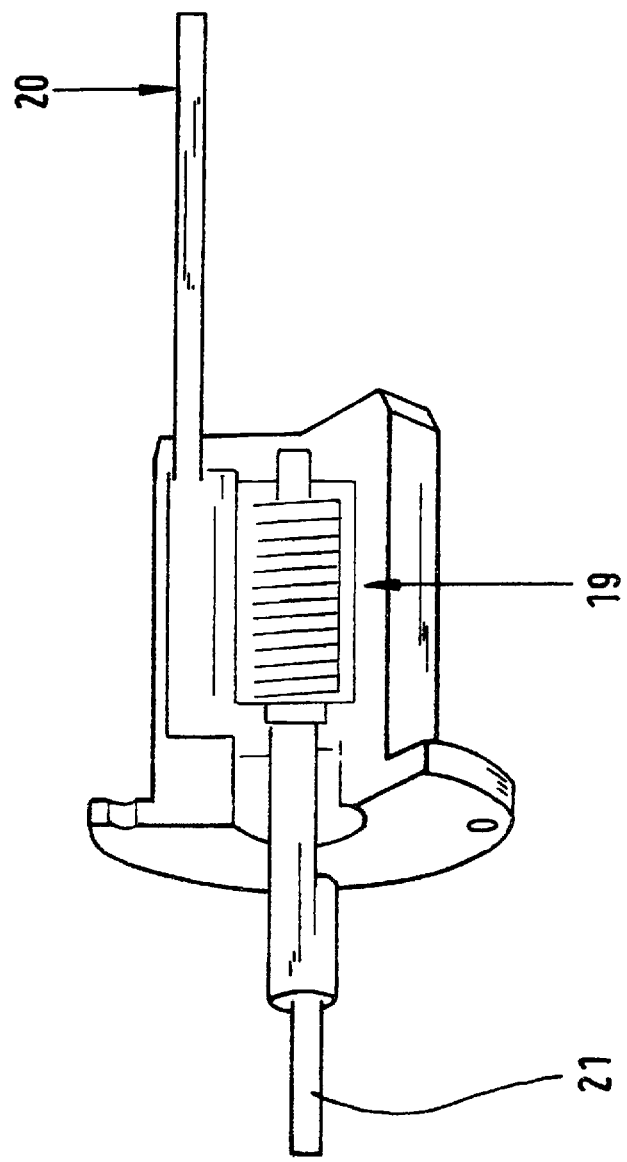

FIG. 3 shows a slip-ring contact 19 for transporting the electrical energy generated by means of the components 18 of the rolling device 3 from the contacts 10 of the rolling device 3 to a battery (not shown).

The reference numerals 20 and 21 indicate electrical lines for transmitting the electric current coming (20) from the rolling device toward the battery (21).

Figure 4:
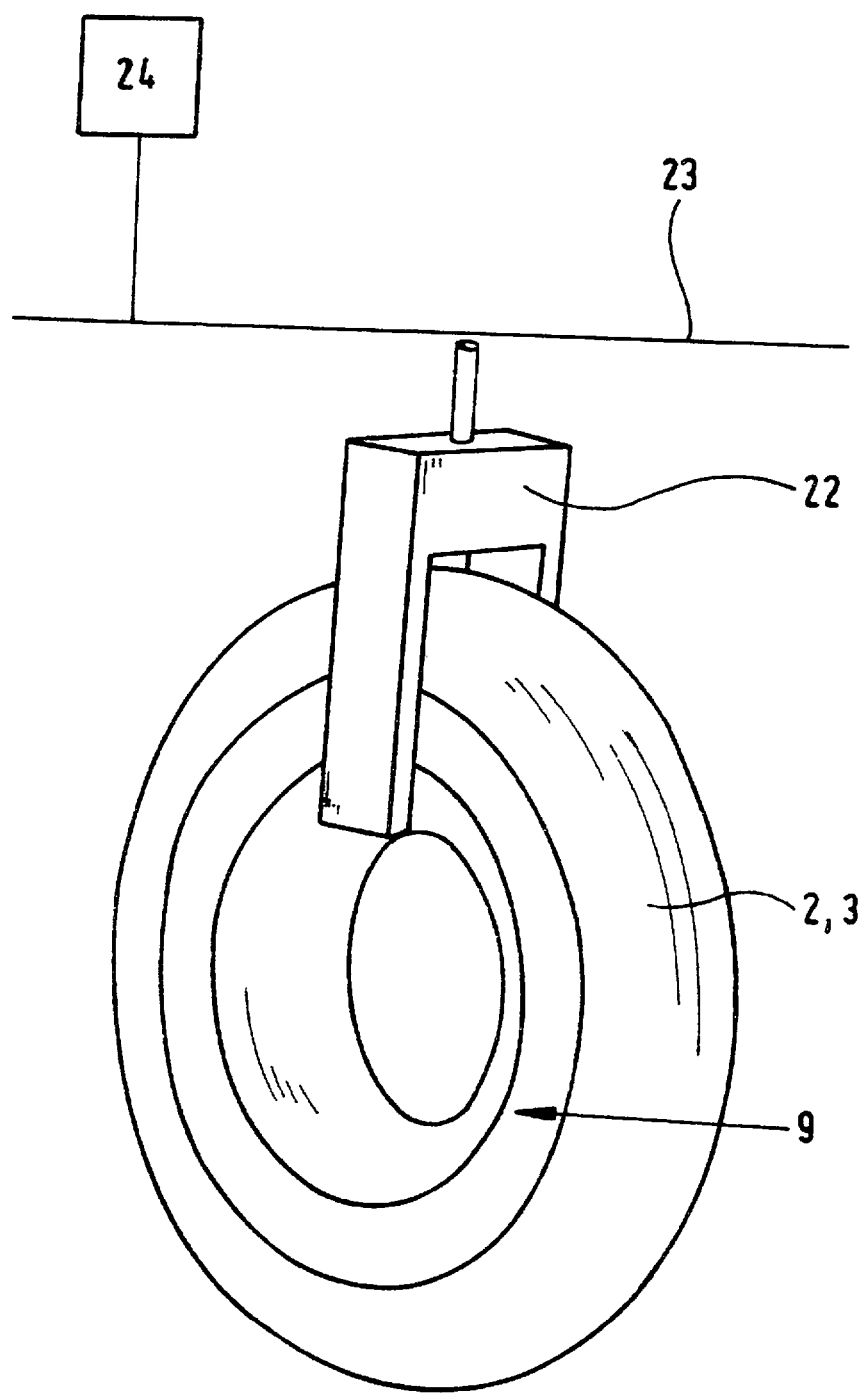

FIG. 4 shows the rolling device 3 according to FIG. 2.

Reference numeral 22 shows a fork by means of which the rolling device 3 and the wheel 2 are attached to the transport device 23.

Reference numeral 24 shows a consumer of electric current (e.g., a mobile phone) for charging with the electric current generated by the components 18 in the region of the rolling device 3.

REFERENCE LIST

1 Rubber sheath
2 Wheel
3 Rolling device
4 Drive element
5 Shielding element
6 Metal segment
7 Output element
8 Stator winding
9 Rim
10 Contacts
11 Axis of rotation
12 Drive magnet
13 North pole
14 South pole
15 Output magnet
16 North pole
17 South pole
18 Components
19 Slip-ring contact
20 Electrical conductor
21 Electrical conductor
22 Fork
23 Transport device
24 Mobile phone

The invention claimed is:

1. A transport device (23) for displacing over a floor for transporting at least one object and/or one person by means of at least one rolling device (3), the transport device (23) having:

a drive element (4) at least indirectly caused to rotate by the rolling device (3), wherein the drive element (4)

comprises at least two drive magnets (12), an output element (7) comprising two or more output magnets (15) wherein the number of drive magnets (12) deviates from the number of output magnets (15), and the output element (7) is rotatable about an axis of rotation (11);

at least one non-magnetic shielding element (5) adapted and configured for modifying the alignment of the magnetic field disposed between the drive element (4) and the output element (7), and at least one stator winding (8) disposed adjacent to the output element (7) in a manner such that when the output element (7) rotates about the axis of rotation (11) electric current is generated in the at least one stator winding; and electrical contacts (10) configured for directing the electric current generated in the at least one stator winding (8) to a battery, the battery being configured for providing power to a device (24) other than the transport device (23).

2. The transport device (23) according to claim 1, wherein the drive element (4) and/or the output element (7) and/or the shielding element (5) and/or the stator windings (8) are disposed in the rolling device (3).

3. The transport device (23) according to claim 1, wherein the drive element (4) is the rolling device (3).

4. The transport device (23) according claim 1, wherein a wheel (2) encloses the rolling device (3).

5. The transport device (23) according to claim 1, wherein the drive magnets (12) and/or the output magnets (15) are implemented as permanent magnets.

6. The transport device (23) according to claim 1, wherein the drive element (4) is annular in design and comprises a plurality of drive magnets (12) disposed adjacent to each other.

7. The transport device (23) according to claim 1, wherein the rotational speed of the output element (7) exceeds the rotational speed of the drive element (4).

8. The transport device (23) according to claim 1, wherein the shielding element (5) comprises two or more metal segments (6).

9. The transport device (23) according to claim 1, wherein the output element (7) is disposed for freely rotating about the axis of rotation (11).

10. The transport device (23) according to claim 1, wherein number of the drive magnets (12) exceeds the number of the output magnets (15).

11. The transport device (23) according to claim 1, wherein the drive element (4) and/or the output element (7) and/or the shielding element (5) and/or the stator windings (8) are disposed without contacting each other.

12. The transport device (23) according to claim 1 wherein the rolling device (3) is connectable to the drive element (4).

13. The transport device (23) according to claim 1, wherein the battery is removable from the transport device (23) and configured for use as a portable power supply.

14. The transport device (23) according to claim 1 further comprising a slip-ring contact (19), the slip ring contact (19) being and adapted and configured to transmit electric current to the battery.

15. A method for generating an electric current by means of the transport device (23) according to claim 1, the method comprising:

displacing the rolling device (3) over the floor in a manner so as to at least indirectly cause the drive element (4) to rotate and generate the magnetic field with the at least one non-magnetic shielding element (5) altering the alignment of a magnetic field disposed between the drive element (4) and the output element (7), and rotating the output element (7), generating electric current in the at least one stator winding (8);

directing the electric current generated in the at least one stator winding (8) to a battery; and with the battery, supplying power to a device (24) other than the transport device (23).

16. The transport device (23) according claim 2, wherein a wheel (2) encloses the rolling device (3).

17. The transport device (23) according claim 3, wherein a wheel (2) encloses the rolling device (3).

18. The transport device (23) according to claim 2, wherein the drive element (4) is annular in design and comprises a plurality of drive magnets (12) disposed adjacent to each other.

19. The transport device (23) according to claim 2, wherein that the drive element (4) and/or the output element (7) and/or the shielding element (5) and/or the stator windings (8) are disposed without contacting each other.

20. The transport device (23) according to claim 2, wherein that the rolling device (3) can be connected to the drive element (4).

* * * * *